United States Patent [19]

Babina et al.

[11] 4,194,996

[45] Mar. 25, 1980

[54] PHENOL FORMALDEHYDE COMPRESSION MOULDING COMPOSITION COMPRISING PHENOL FORMALDEHYDE-WOOD FILLER

[75] Inventors: Margarita D. Babina, Sverdlovsk; Evgeny S. Dunjushkin, Nizhny Tagil; Galina I. Popova, Sverdlovsk; Anatoly D. Sokolov; Jury M. Smirnov, both of Moscow, all of U.S.S.R.

[73] Assignees: Uralsky Lesotekhnichesky Institut, Sverdlovsk; Proizvodstvennoe Obiedinenie "Uralkhimplast", Nizhny Tagil, both of U.S.S.R.

[21] Appl. No.: 949,724

[22] Filed: Oct. 10, 1978

[51] Int. Cl.² .............................................. C08L 1/02
[52] U.S. Cl. .................................................. 260/17.2
[58] Field of Search ...................................... 260/17.2

[56] References Cited

FOREIGN PATENT DOCUMENTS 1569463 12/1972 Fed. Rep. of Germany ........... 260/17.2
1430343 3/1976 United Kingdom ..................... 260/17.2

OTHER PUBLICATIONS

Chem. Abst. 71:40452w, Polycondensation of Phenol and Formaldehyde, Krasnoselov et al.
Chem. Absts. 71:13739p, Hardenable Phenolic Molding Compositions, Ruetgerswerke.
Chem. Absts. 81:111220p, Purification of Water-Production-Phenol-Formaldehyde Resins, Krasnoselov et al.
Chem. Absts. 86:173343t, Role-Wood Pulp Modified-P/Foligomer, Popova et al.

Primary Examiner—Edward M. Woodberry
Attorney, Agent, or Firm—Ladas, Parry, Von Gehr, Goldsmith & Deschamps

[57] ABSTRACT

A compression-molding composition contains a phenol-formaldehyde resin, a filler, a curing agent, viz. hexamethylenetetramine, a curing accelerator such as calcium oxide or magnesium oxide, and a lubricant such as stearin or stearates. The filler comprises a product resulting from the treatment of crushed wood with an aqueous solution of phenol and formaldehyde at the boiling temperature of said solution in the presence of hydrochloric acid at a weight ratio between phenol, formaldehyde, water, hydrochloric acid, crushed wood equal to 0.15–0.80:0.045–0.864:6–15:0.0435–0.1086:1 respectively. Proportions of the components are as follows, parts by weight:

| | |
|---|---|
| phenol-formaldehyde resin | 15 to 45 |
| filler | 47.5 to 75 |
| curing agent | 7 to 9 |
| curing accelerator | 0.5 to 1 |
| lubricant | 0.6 to 0.9 |

The compression-molding composition according to the present invention has an increased water-resistance (17 to 19 mg), heat-resistance (up to 182° C.) along with other properties satisfying the requirements of modern standards. This enlarges the field of application of the compression-molding composition of this invention as compared to the prior art phenolic compression-molding compositions.

5 Claims, No Drawings

PHENOL FORMALDEHYDE COMPRESSION MOULDING COMPOSITION COMPRISING PHENOL FORMALDEHYDE-WOOD FILLER

FIELD OF THE INVENTION

The present invention relates to compression-moulding compositions.

Said compositions are extensively used for the manufacture of articles for various applications in electrical engineering, radio engineering, mechanical engineering, since these compositions have a high heat-resistance and good dielectric properties.

BACKGROUND OF THE INVENTION

For the preparation of compression-moulding compositions use is generally made of phenol-formaldehyde resins produced by condensation of phenol and formaldehyde in an acidic medium and a filler such as that of an organic origin. Among organic fillers use is predominantly made of wood dust, i.e. finely divided wood of coniferous varieties. The filler has a marked influence on mechanical properties of the final articles and to a lesser extent—on heat-resistance and electrical properties.

The need for a better quality of the final articles manufactured from compression-moulding compositions as well as for an enlarged range of raw materials for their preparation gives rise to an intensive research work which has been carried out in different directions such as modifications of a binder, various kinds of treatment of purpose additives and fillers.

Compression moulding compositions with properties thereof modified by way of incorporation, into a novolac resin (or compression-moulding composition), of polyvinyl alcohol or a polyhalohydrocarbon of the paraffin type, or alkyl compounds of titanic acid, or urea and sodium salt of sulphonated lignin are known in the art (cf. FRG Pat. No. 1,669,891; Japanese Patent Applications Nos. 48-17379, 51-17997; U.S. Pat. No. 3,790,441).

Also known are compression-moulding compositions based on amine-modified novolac resins and aromatic polycarboxylic compounds or thermosetting compositions including resins, a curing agent, a solvent, additives, or phenol-lignine-formaldehyde resins (cf. U.S. Pat. No. 3,756,980; FRG Pat. No. 2,141,002; USSR Inventor's Certificate No. 496,290).

There have been described compositions featuring an increased curing speed. A material based on such compositions also retains good processability which is attained by the use of rapid-curing resins or a mixture of hexamethylenetetramine with water-absorbent agents accelerating the curing process.

A compression-moulding composition possessing an increased curing speed while retaining high mechanical properties is also known in the art. It contains 7 to 30% of a resol resin per 100% of a novolac resin, aromatic carboxylic acids in an amount of from 0.4 to 4 parts by weight per 100 parts by weight of the resin mixture, sawdust and other conventional additives.

There are compositions possessing improved dielectric properties which incorporate a copolymer based on polycapramide, phenol and formaldehyde or a mixture of a powder-like polytetrafluoroethylene, glass fibres, china clay, fluorspar.

There are also compression-moulding compositions based on a phenol-formaldehyde resin and incorporating a filler pretreated with a phenol-formaldehyde resin or with a metal salt of an aliphatic $C_3$–$C_{20}$ acid, or with unsaturated aldehydes; alternatively, a mixture of fillers is used in such compositions.

Known in the art are compression-moulding compositions containing as a filler a mixture of textolite sawdust, cotton floss, carbonized cotton cellulose previously impregnated with a phenol-formaldehyde resol resin, or a heat-treated turf preliminary extracted with organic solvents, or a heat-treated non-hydrolyzable residue of turf hydrolysis products, or a crushed root of bistort after extraction of tannides therefrom or a finely-ground furfurol bottoms.

Also known in the art are compression-moulding compositions containing, as a filler, crushed nut shells or a solid lignine (lignosulphonates or mixtures thereof) or lignocellulose; as an additive to a conventional filler use is made in such compositions of up to 40% by weight of alkali-extracted bark or rice scale.

Despite a large scale of research work on elaboration new sources of raw materials for organic fillers and modification of other ingredients of compression-moulding compositions in order to improve their properties, in the manufacture of compression-moulding compositions based on phenol-formaldehyde resins wood flour has been preferably used hitherto as a filler.

Such compression-moulding compositions also incorporate curing agents, curing accelerators, lubricants, dyes. As a curing agent for such resins use may be made of additional amounts of an aldehyde, preferably formaldehyde. Hexamethylenetetramine is also incorporated into such compositions for the same purpose.

As accelerators of the curing process the composition contains, e.g. oxides of calcium or magnesium.

A lubricant is incorporated to prevent adherence of the articles to the mould. As a lubricant use is generally made of stearin or stearates of magnesium, calcium, zinc.

Dyes are incorporated into such compositions to impart a required colour to the final articles.

Nigrosine and induline are generally used as the dyes.

The above-described prior art compositions feature a full spectrum of valuable properties such as high mechanical properties, good dielectric properties, high heat-resistance; however, they have essential disadvantages. Thus, said compositions feature an insufficient plasticity, rather long curing time (low curing rate). The latter characteristic has a detrimental effect on processability of compositions from the economic standpoint. The necessity of using wood flour of a very thin fineness substantially adds to the production cost of the resulting compression-moulding composition. Furthermore, the use of wood flour does not enable the production of compression-moulding powders with a sufficiently high water-resistance.

The use of wood flour preliminarily treated with phenolic alcohols (phenolic wood flour), phenol-formaldehyde resins or with other compositions results in an increased water-resistance of the final articles; however, for a shorter curing time of compression-moulding compositions of this type it is necessary to employ a modified (by various methods) binder, pre-treated purpose additives, and the like. All this complicates the process of the preparation of compression-moulding compositions and increases their production costs.

SUMMARY OF THE INVENTION

It is an object of the present invention to provide such a compression-moulding composition which would possess a high water-resistance, a high curing rate, and an increased plasticity.

It is another object of the present invention to provide such a compression-moulding composition which could be processed by a more advanced method, i.e. compression casting.

These and other objects of the present invention are accomplished by incorporating into a compression-moulding composition containing a phenol-formaldehyde resin, a filler, a curing agent, viz. hexamethylenetetramine, curing accelerators such as calcium oxide and magnesia, and a lubricant such as stearin or stearates, as the filler a product of treatment of crushed wood with an aqueous solution of phenol and formaldehyde at the boiling temperature of said solution in the presence of hydrochloric acid at a weight ratio between phenol, formaldehyde, water, hydrochloric acid, crushed wood equal to 0.15–0.80:0.045–0.864:6–15:0.4–35–0.1086:1 respectively, the above-mentioned components being present in the compression-moulding composition in the following proportions, parts by weight:

| | |
|---|---|
| phenol-formaldehyde resin | 15 to 45 |
| filler | 47.5 to 75 |
| curing agent | 7 to 9 |
| curing accelerator | 0.5 to 1 |
| lubricant | 0.6 to 0.9 |

As the phenol-formaldehyde resins use may be made of resol resins, modified and non-modified novolac resins. The modifications may be effected, e.g. by means of furfurol or other compounds increasing plasticity of the resulting compression-moulding composition.

The selected amount of resins incorporated into the composition is dictated by the necessity of ensuring the required spectrum of physico-mechanical properties and processability of an composition. With the amount of the resin of below 15 parts by weight, the composition has a low plasticity. With an amount of the resin of above 45 parts by weight, the composition has insufficient mechanical characteristics and a high production cost.

As it has been mentioned hereinabove, as the filler use is made of a product of treatment of crushed wood (wastes from wood-sawing and wood-processing, e.g. saw dust) with an aqueous solution of phenol and formaldehyde. This product may be the product resulting from purification of waste waters in the production of phenol and formaldehyde; alternatively, it may be readily obtained by treatment of crushed wood with a specially prepared aqueous phenol-formaldehyde solution.

The filler amount is varied depending on its nature, conditions of production (composition of the aqueous solution of phenol and formaldehyde, weight ratio of the aqueous solution to the crushed wood). When the filler amount is below 47.5 parts by weight, the resulting compression-moulding composition has insufficient mechanical characteristics but a high cost of production. When the filler amount exceeds 75 parts by weight, the resulting compression-moulding composition has an insufficient plasticity, whereby its processing is hindered.

As the curing agent the composition according to the present invention incorporates hexamethylenetetramine; as the curing accelerator use is made of calcium oxide or magnesia.

Lowering the amounts of the curing agent and accelerator below the above-mentioned limit results in an insufficient curing rate and increased residence of the composition under pressure during its processing. Increasing the amount of the curing agent and accelerator above the upper limit mentioned hereinabove impairs properties of the composition and complicates its processing.

As the lubricant use is made of stearin or stearates, preferably calcium stearate. The lubricant prevents adherence of the moulded articles to the compression mould. The above-indicated range of the lubricant amount is optimal. It ensures a good processability of the composition and sufficiently high mechanical properties thereof.

The articles produced as a result of processing of the composition according to the present invention have a dark-brown colour due to the presence of said filler. To impart other colour to the articles, it is advisable to incorporate a dye into the composition. For example, to impart a black colour to the final articles, the composition is added with nigrosine in an amount of from 1.1 to 1.5 part by weight. This amount ensures uniformity of colour distribution over the final article.

To increase heat-resistance of the final articles, it is advisable to add china clay into the composition in an amount of from 3 to 4 parts by weight.

The filler in the composition according to the present invention additionally acts as a binder so that in the formation of the latter the reactive components of wood take part along with phenol and formaldehyde. This has a positive effect on water-resistance of the final compression-moulding composition (its water-absorption is equal to 17–19 mg) and ensures an increased curing rate thereof. The latter condition is especially important in the processing of the composition by compression casting.

The compression-moulding composition according to the present invention also features an increased heat-resistance (up to 182° C.) in addition to other properties satisfying the requirements of modern standards. All this makes it possible to enlarge the range of applications of the compression-moulding composition of this invention in comparison with the prior art compression moulding compositions. Furthermore, the composition according to the present invention may be processed to articles not only by the conventional method of direct compression-moulding but also by a more advanced technology, i.e. compression-casting methods owing to a longer duration of the visco-plastic state of the composition at the temperature of 170° C.

In the processing of the composition according to the present invention by compression-casting the process productivity is increased due to a shortened duration of the visco-plastic state of the composition at the temperature of 120° C. and lesser curing time.

The use of the above-mentioned filler in the composition according to the present invention improves conditions of homogenization of the mixture during preparation of the composition (the mixture does not "dust" upon rolling, has a good rollability), wherefore the final articles have a uniform colour, glaze and commercial appearance.

Low content of free phenol in the filler makes possible to improve sanitary and hygienic conditions of labour.

The use of said filler in the composition according to the present invention makes it possible to replace not only the wood flour employed for the manufacture of general-purpose compression-moulding composition but also the expensive phenolic wood flour employed in the production of special-purpose phenolic compression-moulding powders which provides certain economic advantages.

Moreover, the use of production wastes, namely saw-dust resulting from wood-sawing and wood-processing, for the preparation of a filler as well as the use of waste waters (resin liquor) resulting from the production of phenol and formaldehyde is also economically profitable.

DETAILED DESCRIPTION OF THE INVENTION

The process for the production of a compression-moulding composition according to the present invention is technologically simple and performed in the following manner.

The composition ingredients in the specified proportions are charged into a standard-type mixer, wherein they are intermixed to give a uniform mixture. Then the resulting homogeneous mixture is delivered into a roll mill with the rolls rotating at a different speed. The working roll is heated to a temperature within the range of from 85 to 105° C., the idle roll is heated to a temperature of from 120 to 135° C. The clearance between the rolls is 2 to 4 mm. Duration of rolling is varied within the range of from 55 to 80 seconds. After rolling, the resulting material is cooled, ground and screened.

To prepare a filler, into a standard-type reactor there are charged production wastes from wood-sawing and wood-processing, for example saw-dust of coniferous varieties, an aqueous solution of phenol, formaldehyde and hydrochloric acid. Then the reactor contents is intermixed, brought to reflux and the process is further conducted for the period of 2.5 hours, whereafter the resulting product is separated from the liquid phase.

For a better understanding of the present invention, some specific Examples are given hereinbelow by way of illustration.

EXAMPLE 1

Into a standard-type mixer there are charged 15 parts by weight of a novolac phenol-formaldehyde resin, 7.0 parts by weight of hexamethylenetetramine, 1 part by weight of calcium oxide, 0.9 parts by weight of calcium stearate, 1.5 part by weight of nigrosine and 75 parts by weight of a product of treatment of crushed wood by an aqueous solution of phenol and formaldehyde at the boiling temperature of the solution in the presence of hydrochloric acid.

The product is obtained at the weight ratio between phenol, formaldehyde, water, hydrochloric, acid and crushed wood of coniferous plants equal to 0.8:0.242:6:0.0435:1 respectively. For the preparation of the aqueous solution use is made of commercial phenol and formalin.

Intermixing of the composition ingredients is effected over the period of 30 minutes. After blending, the resulting mixture is rolled at the temperature of the idle roll of 130° C. and that of the working roll of 95° C. for 65 seconds. The gap between the rolls is equal to 2.5 mm. The rolled material is cooled and ground. The properties of the composition are given in the Table hereinbelow.

EXAMPLE 2

Into a standard-type mixer there are charged 15 parts by weight of a novolac phenol-formaldehyde resin, 7 parts by weight of hexamethylenetetramine, 1 part by weight of calcium oxide, 0.9 part by weight of calcium stearate and 75 parts by weight of a product resulting from the treatment of crushed wood of coniferous plants by an aqueous solution of phenol and formaldehyde at the boiling point of the solution in the presence of hydrochloric acid.

This product is obtained at the weight ratio of phenol, formaldehyde, water, hydrochloric acid and crushed wood of coniferous plants equal to 0.8:0.242:6:0.0435:1 respectively.

Blending of the composition components is effected for the period of 30 minutes. After mixing, the resulting mixture is rolled at the temperature of the idle roll of 130° C. and that of the working roll of 95° C. for 65 seconds. The gap between the rolls is 2.5 mm. The rolled material is cooled, crushed and screened. The properties of the composition are shown in the Table hereinbelow.

EXAMPLE 3

Into a standard-type mixer there are charged 45 parts by weight of a novolac phenol-formaldehyde resin, 9 parts by weight of hexamethylenetetramine, 0.5 part by weight of calcium oxide, 0.6 part by weight of calcium stearate and 47.5 parts by weight of a product resulting from the treatment of crushed wood with an aqueous solution of phenol and formaldehyde at the boiling temperature of the solution in the presence of hydrochloric acid.

This product is obtained at the weight ratio of phenol, formaldehyde, water, hydrochloric acid and crushed wood of coniferous plants equal to 0.15:0.048:10:0.0724:1 respectively.

For the preparation of the aqueous solution use is made of crystalline phenol and formalin.

Blending of the composition ingredients is effected for the period of 30 minutes. After mixing, the resulting mixture is rolled at the temperature of the idle roll of 135° C. and that of the working roll of 105° C. for 80 seconds. The gap between the rolls is equal to 4 mm. The rolled material is cooled ground and screened. Properties of the composition are shown in the Table hereinbelow.

EXAMPLE 4

Into a standard-type mixer there are charged 45 parts by weight of a novolac phenol-formaldehyde resin, 9 parts by weight of hexamethylenetetramine, 0.5 part by weight of calcium oxide, 0.6 part by weight of calcium stearate and 47.5 parts by weight of a product resulting from the treatment of crushed wood with an aqueous solution of phenol and formaldehyde at the boiling temperature of the solution in the presence of hydrochloric acid.

Said product is obtained with the use of waste waters from the production of phenol and formaldehyde which are added with hydrochloric acid at the weight ratio between phenol, formaldehyde, water, hydrochloric acid and crushed wood of coniferous plants equal to 0.15:0.048:10:0.0724:1 respectively.

Blending of the composition ingredients is effected for a period of 30 minutes. After blending, the resulting mixture is rolled at the temperature of the idle roll of 135° C. and that of the working roll of 105° C. for the period of 80 seconds. The gap between the rolls is 4 mm. The rolled material is cooled, crushed and screened. The composition properties are shown in the Table hereinbelow.

EXAMPLE 5

Into a standard-type mixer there are charged 40 parts by weight of a furfurol-modified novolac phenol-formaldehyde resin, 8 parts by weight of hexamethylenetetramine, 0.5 part by weight of calcium oxide, 0.6 part by weight of calcium stearate, 3 parts by weight of china clay and 52 parts by weight of a product resulting from the treatment of crushed wood with an aqueous solution of phenol and formaldehyde at the boiling temperature of the solution in the presence of hydrochloric acid.

Said product is obtained at the weight ratio of phenol, formaldehyde, water, hydrochloric acid and crushed wood of coniferous plants equal to 0.2:0.17:10:0.0724:1 respectively. Blending of the composition ingredients is effected for the period of 30 minutes. On completion of blending, the resulting mixture is rolled at the temperature of the idle roll of 120° C. and that of the working roll of 58° C. for 55 seconds. The gap between the rolls is equal to 2 mm. The rolled material is cooled, crushed and screened. The composition properties are shown in the Table, hereinbelow.

EXAMPLE 6

Into a standard-type mixture there are charged 40 parts by weight of a furfurol-modified novolac phenol-formaldehyde resin, 8 parts by weight of hexamethylenetetramine, 0.5 part by weight of calcium oxide, 0.6 part by weight of calcium stearate, 4 parts by weight of china clay, 1.1 part by weight of nigrosine and 52 parts by weight of a product resulting from the treatment of crushed wood with an aqueous solution of phenol and formaldehyde at the boiling temperature of the solution in the presence of hydrochloric acid.

Said product is obtained at the weight ratio of phenol, formaldehyde, water, hydrochloric acid and crushed wood of coniferous plants equal to 0.2:0.17:10:0.0724:1 respectively.

Blending of the composition ingredients is effected for the period of 30 minutes. On completion of blending, the resulting mixture is rolled at the temperature of the idle roll of 120° C. and that of the working roll of 85° C. for 55 seconds. The gap between the rolls is equal to 2 mm. The rolled material is cooled, ground and screened. Properties of the composition are shown in the Table hereinbelow.

EXAMPLE 7

Into a standard-type mixer there are charged 15 parts by weight of a novolac phenol-formaldehyde resin, 7 parts by weight of hexamethylenetetramine, 1 part by weight of calcium oxide, 0.9 part by weight of stearin and 56.2 parts by weight of a product resulting from the treatment of crushed wood with an aqueous solutions of phenol and formaldehyde at the boiling temperature of the solution in the presence of hydrochloric acid.

Said product is obtained at the weight ratio of phenol, formaldehyde, water, hydrochloric acid and crushed wood of coniferous plants equal to 0.8:0.242:6:0.0435:1 respectively.

As the aqueous solution use is made of waste waters from the production of phenol and formaldehyde.

Blending of the composition is effected for 30 minutes. On completion of blending, the resulting mixture is rolled at the temperature of the idle roll is 130° C. and that of the working roll of 105° C. for 65 seconds. The gap between the rolls is equal to 2.5 mm. The rolled material is cooled, ground and screened. The composition properties are shown in the Table hereinbelow.

EXAMPLE 8

Into a standard-type mixer there are charged 45 parts by weight of a novolac phenol-formaldehyde resin, 9 parts by weight of hexamethylenetetramine, 0.5 part by weight of magnesia, 0.6 part by weight of calcium stearate, 47.5 parts by weight of a product resulting from the treatment of crushed wood with an aqueous solution of phenol and formaldehyde at the boiling temperature of the solution in the presence of hydrochloric acid.

This product is obtained at the weight ratio of phenol, formaldehyde, water, hydrochloric acid and crushed wood of coniferous plants equal to 0.15:0.048:10:0.0724:1 respectively.

Blending of the composition is effected for 30 minutes. After blending, the resulting mixture is rolled at the temperature of the idle roll of 135° C. and that of the working roll of 105° C. for 80 seconds. The gap between the rolls is 4 mm. The rolled material is cooled, ground and screened. The composition properties are shown in the following Table.

Table

| Characteristics | Properties of the composition of Examples | | | | | | | |
|---|---|---|---|---|---|---|---|---|
| | 1 | 2 | 3 | 4 | 5 | 6 | 7 | 8 |
| Raschig flowability, mm | 152 | 148 | 156 | 151 | 167 | 162 | 158 | 153 |
| Water-absorption, mg | 18 | 17 | 19 | 18 | 19 | 19 | 18 | 18 |
| Martens temperature, °C. | 171 | 173 | 158 | 164 | 182 | 179 | 167 | 161 |
| Curing rate, s | 50 | 50 | 55 | 55 | 60 | 60 | 50 | 60 |
| Resilience, kJ/m$^2$ | 6.4 | 6.6 | 6.2 | 6.5 | 6.3 | 6.2 | 6.4 | 6.6 |
| Breaking stress at static bending, mPA/m$^2$ | 86.3 | 88.1 | 86.8 | 88.4 | 80.8 | 80.1 | 82.1 | 87.4 |
| Electric Strength, MV/mm | 16.6 | 16.6 | 17.7 | 17.4 | 16.8 | 16.7 | 16.4 | 16.9 |
| Duration of visco-plastic state, sec, | | | | | | | | |
| at 120° C. | 280 | 280 | 260 | 260 | 300 | 300 | 280 | 280 |
| at 170° C. | 32 | 32 | 30 | 30 | 40 | 38 | 32 | 32 |
| Curing time, sec (at 170° C.) | 88 | 88 | 90 | 90 | 96 | 96 | 88 | 90 |

What is claimed is:

1. A compression-moulding composition containing 15 to 45 parts by weight of a phenol-formaldehyde resin, 47.5 to 75 parts by weight of a filler comprising a product of the treatment of crushed wood with an aqueous solution of phenol and formaldehyde at the boiling temperature of said solution in the presence of hydrochloric acid at a weight ratio between phenol, formaldehyde, water, hydrochloric acid and crushed wood equal to 0.15–0.80:0.045–0.864:6–15:0.0435–0.1086:1 respectively, 7 to 9 parts by weight of a curing agent, i.e. hexamethylenetetramine, 0.5 to 1 part by weight of a curing accelerator selected from the group consisting of calcium oxide and magnesium oxide and 0.6 to 0.9 part by weight of a lubricant selected from the group consisting of stearin and stearates.

2. A compression-moulding composition as claimed in claim 1, wherein a dye is present in an amount of from 1.1 to 1.5 part by weight.

3. A compression-moulding composition as claimed in claim 2, wherein nigrosine is used as the dye.

4. A compression-moulding composition as claimed in claim 1, wherein china clay is contained in an amount of from 3 to 4 parts by weight.

5. A compression-moulding composition as claimed in claim 2, wherein china clay is contained in an amount of from 3 to 4 parts by weight.